US012379560B2

(12) United States Patent
Courchaine et al.

(10) Patent No.: US 12,379,560 B2
(45) Date of Patent: Aug. 5, 2025

(54) FIBER OPTIC CASSETTES AND SPLICE MODULES

(71) Applicant: AFL Telecommunications LLC, Duncan, SC (US)

(72) Inventors: Wilfred Courchaine, Moore, SC (US); Shirley Ball, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 18/367,787

(22) Filed: Sep. 13, 2023

(65) Prior Publication Data

US 2024/0004156 A1    Jan. 4, 2024

Related U.S. Application Data

(63) Continuation of application No. 17/505,282, filed on Oct. 19, 2021, now Pat. No. 11,789,227, which is a continuation of application No. 17/064,216, filed on Oct. 6, 2020, now Pat. No. 11,169,346, which is a continuation of application No. 16/456,558, filed on Jun. 28, 2019, now Pat. No. 10,845,561.

(51) Int. Cl.
    *G02B 6/44*    (2006.01)
(52) U.S. Cl.
    CPC ......... *G02B 6/4454* (2013.01); *G02B 6/4452* (2013.01)
(58) Field of Classification Search
    CPC .............................. G02B 6/4452; G02B 6/4454
    See application file for complete search history.

(56) References Cited

U.S. PATENT DOCUMENTS

| | | | |
|---|---|---|---|
| 4,397,088 A | 8/1983 | Hampel | |
| 4,920,667 A | 5/1990 | Dixon | |
| 5,161,318 A | 11/1992 | Bergman et al. | |
| 5,285,515 A * | 2/1994 | Milanowski | ......... G02B 6/4453 |
| | | | 385/135 |
| 5,530,786 A | 6/1996 | Radliff et al. | |
| 5,893,224 A | 4/1999 | Harrington et al. | |
| 6,435,580 B1 | 8/2002 | Lock | |
| 6,948,569 B1 | 9/2005 | Conaway et al. | |
| 7,257,909 B2 | 8/2007 | Shaffer et al. | |
| 7,314,096 B2 | 1/2008 | Shaffer et al. | |

(Continued)

FOREIGN PATENT DOCUMENTS

| | | |
|---|---|---|
| AU | 199944877 A1 | 3/2000 |
| CA | 2350471 C | 6/2004 |

(Continued)

*Primary Examiner* — Ryan A Lepisto
(74) *Attorney, Agent, or Firm* — Dority & Manning, P.A.

(57) ABSTRACT

A fiber optic cassette includes a cassette body, the cassette body extending along a longitudinal axis between a front and a rear, extending along a lateral axis between a first side and a second side, and extending along a transverse axis between a bottom and a top. The fiber optic cassette further includes a plurality of fiber optic adapter apertures defined at the front of the cassette body. The fiber optic cassette further includes a side channel defined at the first side of the cassette body, the side channel including an entry aperture spaced from the rear of the cassette body along the longitudinal axis. The fiber optic cassette further includes a splice module receptacle defined in the cassette body.

18 Claims, 5 Drawing Sheets

(56) References Cited

U.S. PATENT DOCUMENTS

| | | | |
|---|---|---|---|
| 7,418,186 B1 * | 8/2008 | Grubish | G02B 6/4477 385/137 |
| 7,477,826 B2 * | 1/2009 | Mullaney | H02G 15/115 385/134 |
| 7,607,244 B2 | 10/2009 | Hishida | |
| 8,824,850 B2 | 9/2014 | Garcia et al. | |
| 10,061,089 B2 * | 8/2018 | Bridges | H05K 3/301 |
| 10,845,561 B1 * | 11/2020 | Courchaine | G02B 6/4454 |
| 11,169,346 B2 * | 11/2021 | Courchaine | G02B 6/4454 |
| 11,789,227 B2 * | 10/2023 | Courchaine | G02B 6/4452 385/135 |
| 2006/0070265 A1 | 4/2006 | Cohen | |
| 2013/0243386 A1 | 9/2013 | Pimentel et al. | |
| 2016/0353951 A1 | 12/2016 | Buchanan et al. | |
| 2017/0101755 A1 | 4/2017 | Zhang et al. | |
| 2017/0152638 A1 | 6/2017 | Fu et al. | |
| 2018/0087229 A1 | 3/2018 | French | |
| 2018/0163356 A1 | 6/2018 | Koehler et al. | |
| 2018/0284379 A1 | 10/2018 | Leonard et al. | |
| 2019/0004267 A1 | 1/2019 | Courchaine et al. | |

FOREIGN PATENT DOCUMENTS

| | | |
|---|---|---|
| CN | 2825735 Y | 10/2006 |
| CN | 201047073 Y | 4/2008 |
| CN | 201990976 U | 9/2011 |
| CN | 202672085 U | 1/2013 |
| CN | 104314034 A | 1/2015 |
| CN | 204401540 U | 6/2015 |
| CN | 205975462 U | 2/2017 |
| CN | 106759044 A | 5/2017 |
| CN | 106801398 A | 6/2017 |
| CN | 106826100 A | 6/2017 |
| CN | 106939571 A | 7/2017 |
| CN | 206467623 U | 9/2017 |
| CN | 206503109 U | 9/2017 |
| CN | 206554005 U | 10/2017 |
| CN | 206554006 U | 10/2017 |
| CN | 207277271 U | 4/2018 |
| CN | 207537948 U | 6/2018 |
| CN | 108914866 A | 9/2020 |
| CN | 108625334 A | 11/2020 |
| JP | H09178995 A | 7/1997 |
| WO | WO2007123525 A1 | 11/2007 |
| WO | WO2018165453 A1 | 9/2018 |

* cited by examiner

FIBER OPTIC CASSETTES AND SPLICE MODULES

FIELD

The present application is a continuation of U.S. patent application Ser. No. 17/505,282, filed on Oct. 19, 2021, which is a continuation of U.S. patent application Ser. No. 17/064,216, filed on Oct. 6, 2020, which is a continuation of U.S. patent application Ser. No. 16/456,558, filed on Jun. 28, 2019, the disclosures of all of which are incorporated by reference herein in their entireties.

BACKGROUND

As demands for greater telecommunications access and connectivity speeds increase, so do the demands for greater numbers of fiber optic connections in data centers. Enclosures, racks, and other environments which house such connections must accommodate greater numbers of fiber optic connections, along with the associated cables, fibers, connectors, and other hardware.

Fiber optic cassettes are typically utilized to accommodate fiber optic patch and splice connections. As the need for greater numbers of fiber optic connections and high density fiber optic environments increases, so do the demands for smaller, more compact cassettes which can provide patch and splice features for a large number of fibers and fiber optic connectors. At the same time, such cassettes must be easy to utilize, allowing technicians to easily access the components of such cassettes for patching and splicing purposes. Such easy access in many cases must be facilitated in crowded, high-density data center environments.

Accordingly, improved fiber optic cassettes which address the above concerns are desired in the art. Additionally, improved splice modules which can be utilized with such cassettes would be advantageous.

BRIEF DESCRIPTION

Aspects and advantages of the invention will be set forth in part in the following description, or may be obvious from the description, or may be learned through practice of the invention.

In accordance with one embodiment, a fiber optic cassette defining a mutually orthogonal coordinate system having a longitudinal axis, a lateral axis, and a transverse axis is provided. The fiber optic cassette includes a cassette body, the cassette body extending along the longitudinal axis between a front and a rear, extending along the lateral axis between a first side and a second side, and extending along the transverse axis between a bottom and a top. The fiber optic cassette further includes a plurality of fiber optic adapter apertures defined at the front of the cassette body. The fiber optic cassette further includes a side channel defined at the first side of the cassette body, the side channel including an entry aperture spaced from the rear of the cassette body along the longitudinal axis. The fiber optic cassette further includes a splice module receptacle defined in the cassette body.

The fiber optic cassette may further include an insert module removably insertable into an intermediate portion of the side channel.

The fiber optic cassette may further include a splice module removably insertable into the splice module receptacle. The splice module may include a splice insert.

In accordance with another embodiment, a splice module may be provided. The splice module may include a splice insert.

A splice insert may include an insert body, the insert body including a first side and an opposing second side. The insert body may define a plurality of first channels on the first side and a second channel on the second side, the second channel having a maximum width which is greater than a maximum width of any of the plurality of first channels. The second channel is positioned between a first portion of the plurality of first channels and a second portion of the plurality of first channels in a linear array.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
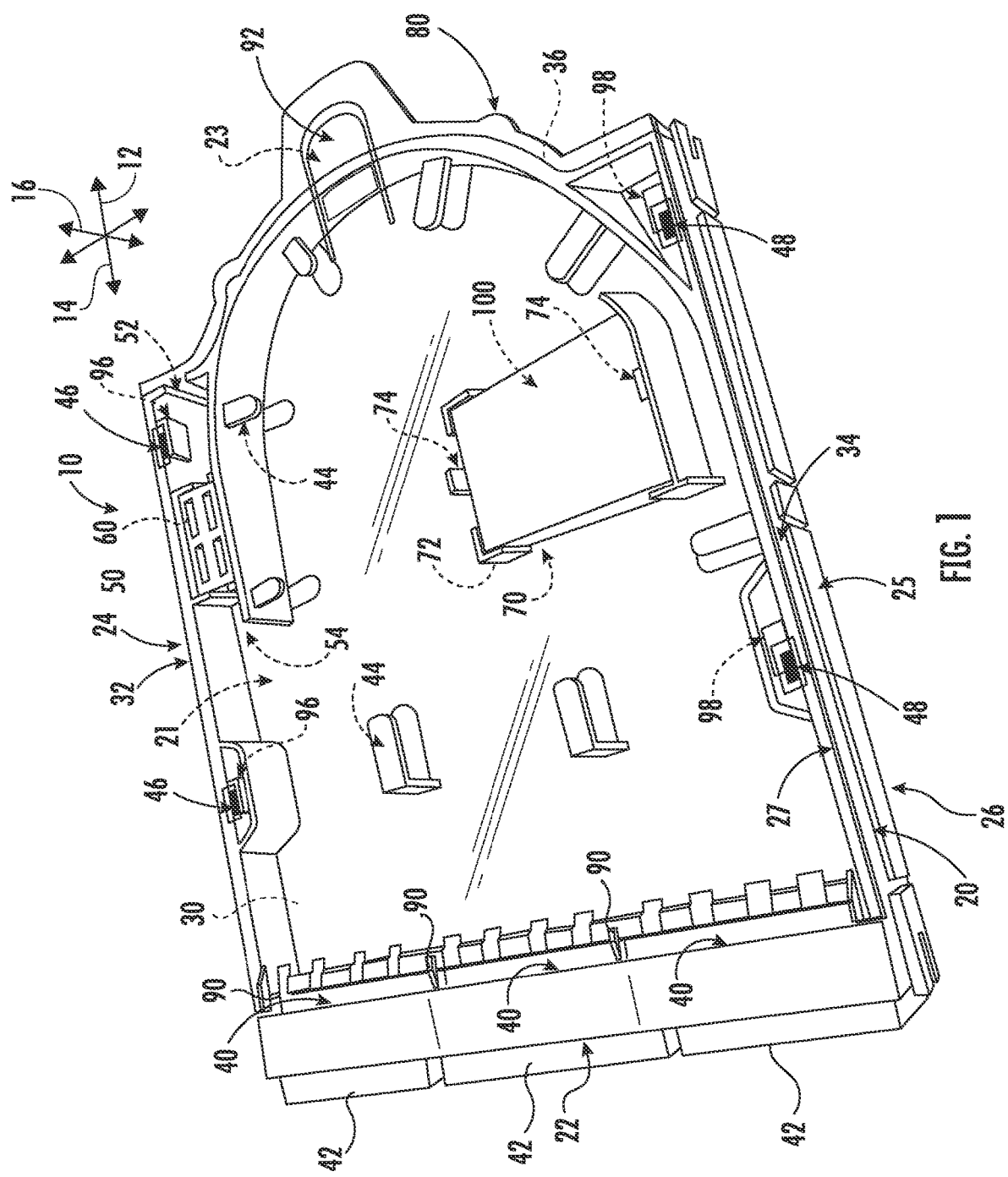
FIG. 1 is a perspective view of a fiber optic cassette in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
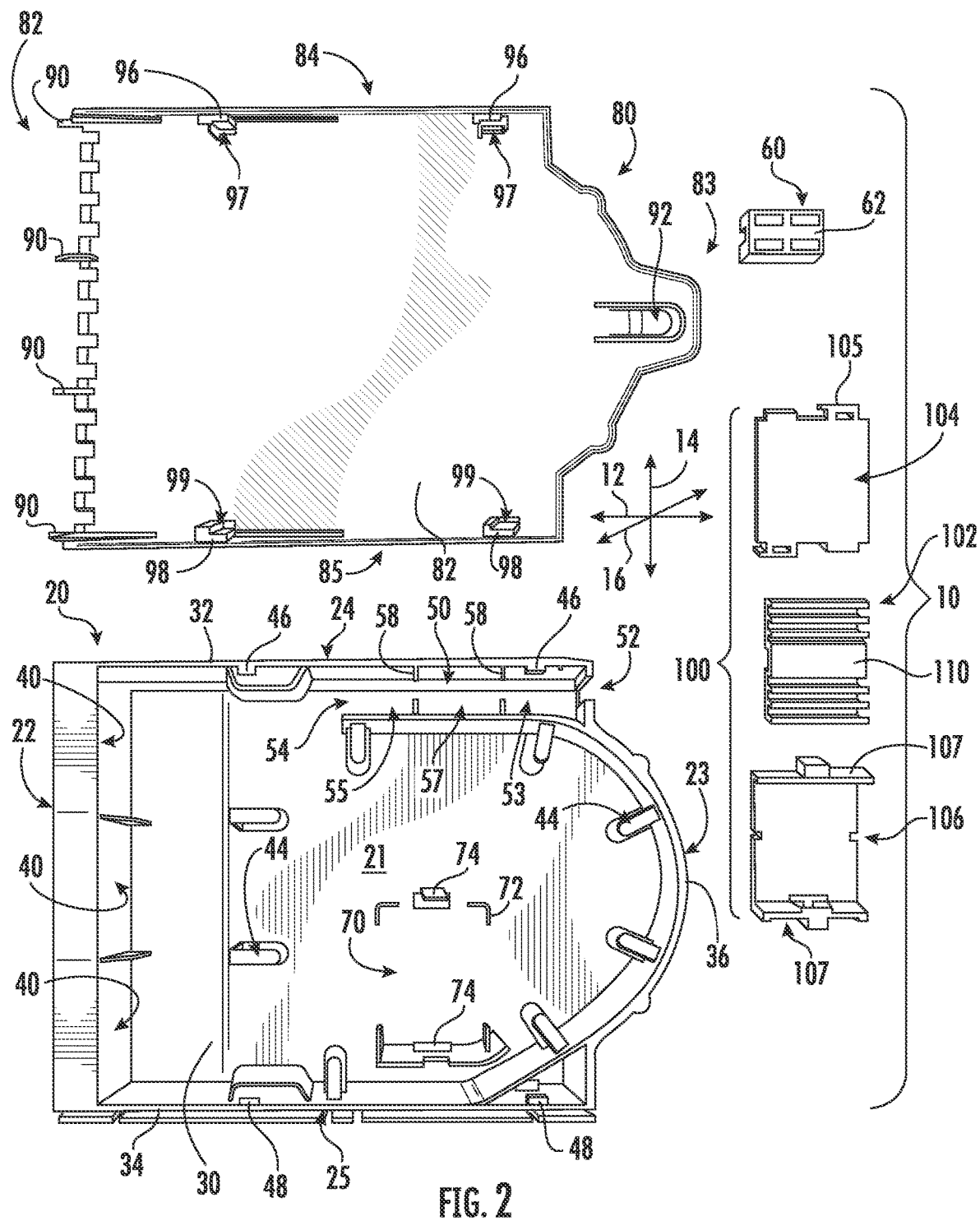
FIG. 2 is a top disassembled view of the components of a fiber optic cassette in accordance with embodiments of the present disclosure.
Figure 3:
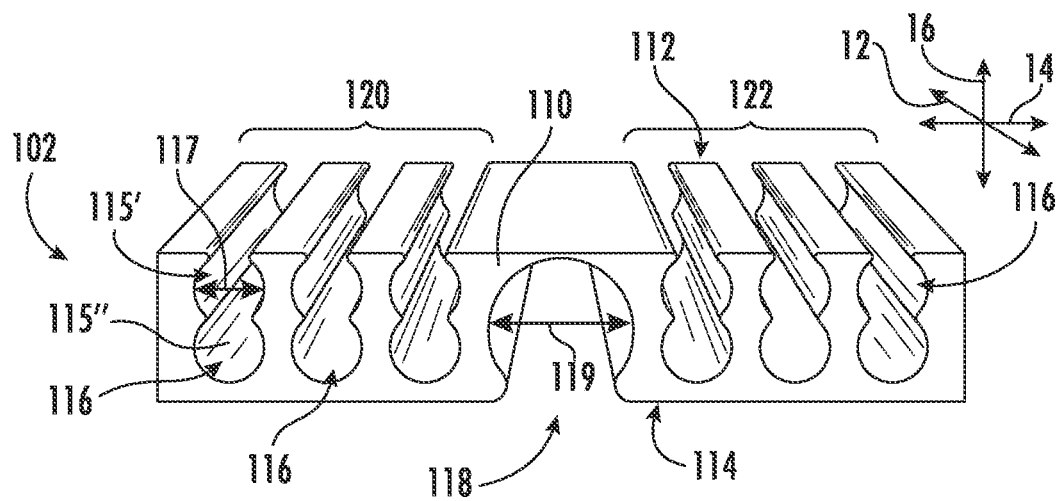
FIG. 3 is a side perspective view of a fiber optic splice insert in accordance with embodiments of the present disclosure.
Figure 4:
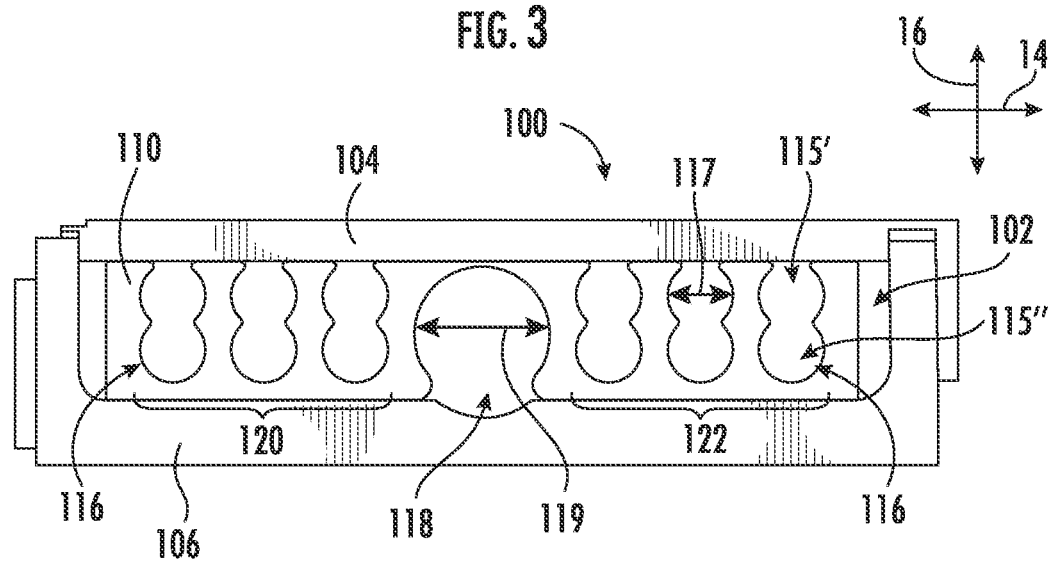
FIG. 4 is a side view of a fiber optic splice module in accordance with embodiments of the present disclosure.
Figure 5:
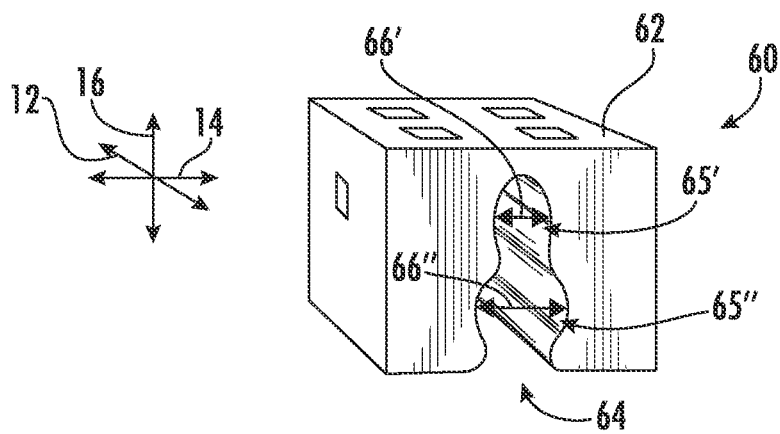
FIG. 5 is a side perspective view of an insert module in accordance with embodiments of the present disclosure.
Figure 6:
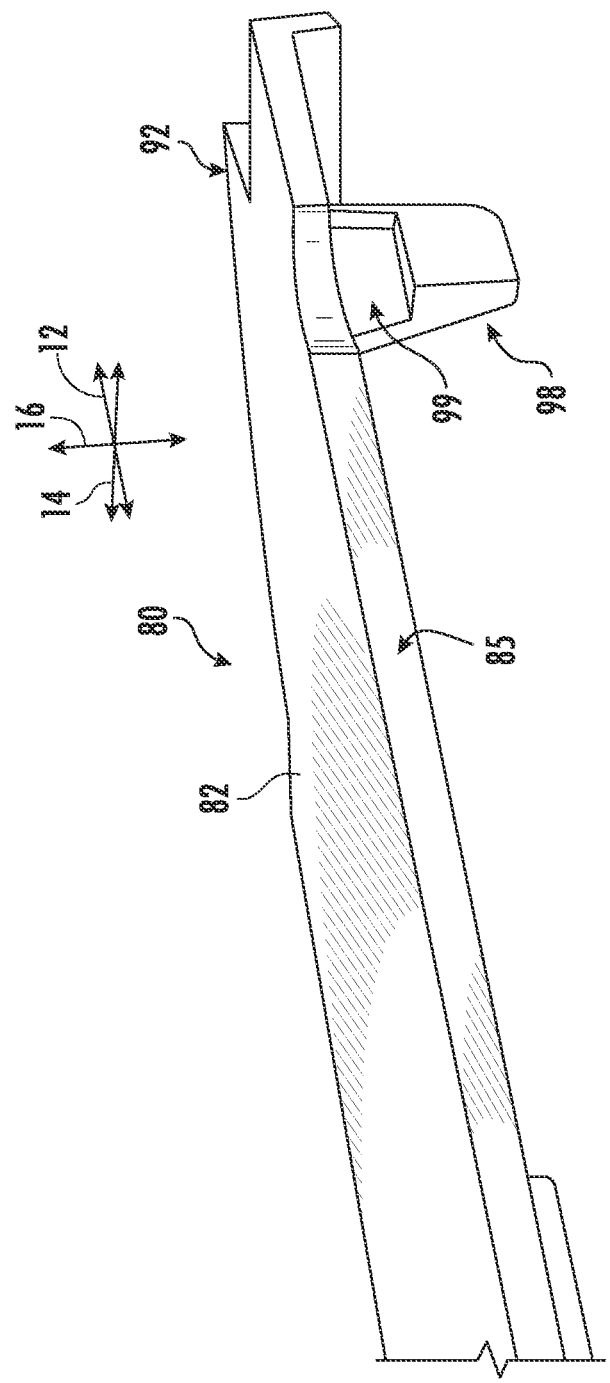
FIG. 6 is a perspective view illustrating a side tab of a cover of a fiber optic cassette in accordance with embodiments of the present disclosure.
Figure 7:
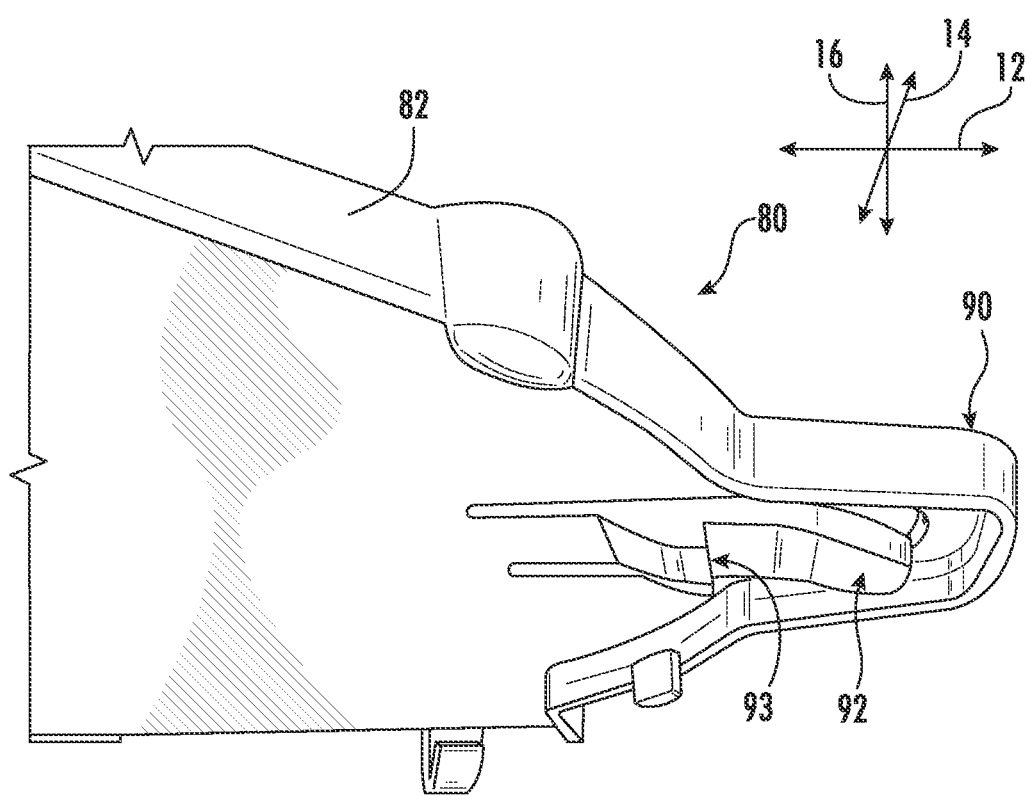
FIG. 7 is a perspective view illustrating a latch of a cover of a fiber optic cassette in accordance with embodiments of the present disclosure.

Referring now to FIGS. 1 through 7, embodiments of fiber optic cassettes 10 and splice modules 100 are shown. Fiber optic cassettes 10 in accordance with the present disclosure advantageously provide improved patch and splice solutions for high density fiber optic environments. For example, fiber optic cassettes 10 in accordance with the present disclosure advantageously provide improved cable routing into the cassettes 10. Further, splice modules 100 allow for splicing to be completed outside of the cassettes 10 and then moved into the cassettes 10. Further, cassettes 10 are relatively more compact and space-efficient than known patch and splice cassettes.

A mutually orthogonal coordinate system may be defined for cassette 10 in accordance with the present disclosure. The coordinate system may include a longitudinal axis 12, a lateral axis 14, and a transverse axis 16, each of which may be mutually orthogonal to the others in the coordinate system.

A cassette 10 in accordance with the present disclosure may include a cassette body 20 which defines an interior 21. Body 20 may extend along the longitudinal axis between a front 22 and a rear 23, and may extend along the lateral axis between a first side 24 and a second side 25, and may extend along the transverse axis 16 between a bottom 26 and a top 27. A base wall 30 may be positioned at the bottom 26, and first and second side walls 32, 34 may be positioned at the first side 24 and second side 25, respectively. A rear wall 36 may be positioned at or extend to the rear 23. For example, in exemplary embodiments as shown, the rear wall 36 is or includes a curved portion that extends from a position between the front 22 and rear 23 (in exemplary embodiments more proximate rear 23 than front 22) to the rear 23.

Cassette 10 may further include a plurality of fiber optic adapter apertures 40 which may be defined in the cassette body 20. For example, such adapter apertures 40 may be defined at the front 22, as shown. Each adapter aperture 40 may accommodate one or more fiber optic adapters 42 therein. In exemplary embodiments, no fiber optic adapter apertures or adapters are defined in the rear 23 or rear wall 36.

Cassette 10 may further include a plurality of retention tabs 44 disposed in the interior 21 of body 20. Retention tabs 44 may be positioned above base wall 30 to allow fibers within the interior 21 to be routed between the retention tabs 44 and base wall 30. Retention tabs 44 may be advantageously positioned in the interior 21 such that fibers can be routed therein without exceeding bending radius limits thereof.

Cassette 10 may further include one or more side tabs 46, 48. Side tabs 46, 48 may be disposed at the first side 24 and second side 25, respectively. For example, side tabs 46, 48 may extend from the first side wall 32 and second side wall 34, respectively, into the interior 21, such as along the lateral axis 14. As discussed herein, side tabs 46, 48 may interface with a cover of the cassette 10 to removably connect the cover to the cassette body 20.

Cassette 10 may further include a side channel 50 defined therein. Side channel 50 may, for example, be defined at the first side 24, such as between the rear 23 and front 22 along the longitudinal axis 12. The side channel 50 may extend, such as along the longitudinal axis 12, between an entry aperture 52 and an exit aperture 54. The entry aperture 52 may provide an entry into the side channel 50 from exterior to the cassette 10, and the exit aperture 54 may provide an exit from the side channel 50 into a remainder of the interior 21. Entry aperture 52 may be spaced from the rear 23, as shown.

Side channel 50 may generally facilitate the entry of fiber optic cables and/or buffer tubes into the cassette 10 for splicing and connection purposes. A cable/buffer tube may enter the side channel 50 through the entry aperture 52 and exit the side channel 50 into the remainder of the interior 21 through the exit aperture 54. Further, the side channel 50 may be secured to the cassette 10 within the side channel 50.

For example, an insert module 60 may be removable insertable into the side channel 50. The cable/buffer tube may advantageously be insertable into the insert module 60, and the insert module 60 and cable/buffer tube then inserted into the side channel 50 to secure the cable/buffer tube to the cassette 10.

In some embodiments, the side channel 50 may be divided into various portions, such as an entry portion 53, exit portion 55, and intermediate portion 57. Partitions 58 may subdivide the side channel 50 into such portions. In exemplary embodiments, the insert module 60 may be removably insertable into the intermediate portion 57.

Insert module 60 may, for example, be formed from a suitably resilient material such as rubber, such as in exemplary embodiments vulcanized rubber. Alternatively, other suitable materials may be utilized. Insert module 60 may include a body 62 which defines a channel 64 in which one or more cables/buffer tubes may be inserted. Channel 64 may include one or more channel portions 65', 65". In exemplary embodiments, each channel portion 65 may have a generally elliptical cross-sectional profile. When the insert module 60 is inserted in the cassette 10, the channel portions 65 may be stacked and aligned along the transverse axis 16. Further, each channel portion 65', 65" may have a maximum width 66', 66". In exemplary embodiments, the maximum width 66" may be greater than the maximum width 66'. Further, in exemplary embodiments, channel portion 65' may be above channel portion 65" (e.g. relatively closer to top 27) along the transverse axis 16. Still further, in exemplary embodiments, a portion of body 62 may be stacked above the channel 64 and channel portions 65 thereof, such that the cables/buffer tubes are secured between the body 62 and base wall 30.

Cassette 10 may further include a splice module receptacle 70 defined in the cassette body 20, such as within the interior 21. Receptacle 70 may provide a location for removably connecting a splice module 100 to the cassette 10. Splice module receptacle 70 may, for example, include a frame 72 and/or one or more clips 74 which removable secure the splice module 100 in the interior 21.

As discussed, a splice module 100 may be provided in a cassette 10. The splice module 100 may, for example, be removably insertable into the splice module receptacle 70. Splice module 100 may include a splice insert 102, and may further include a holder base 104 and a holder cover 106. The insert 102 may, for example, be positionable between the holder base 104 and holder cover 106, such that when assembled the insert 102 is sandwiched between the holder base 104 and holder cover 106. Holder base 104 and holder cover 106 may be removably connectable to each other, such as via clips 105, 107 respectively thereof, to removably secure the insert 102 therebetween.

When inserted into a cassette 10, such as the interior 21 thereof, a splice module 100 may be inserted into and secured within receptacle 70. In some embodiments, for example, module 100 may be inserted within the frame 72. In some embodiments, for example, module 100 may be secured within receptacle by contact of clips 74 with the base 104 and/or cover 106.

Splice insert 102 may include an insert body 110 which includes a first side 112 and an opposing second side 114. A plurality of first channels 116 may be defined in the insert body 110, such as on the first side 112 thereof. One or more second channels 118 may be defined in the insert body 110, such as on the second side 114 thereof.

Each first channel 116 may have a maximum width 117, and each second channel 118 may have a maximum width 119. In exemplary embodiments, the maximum width 119 of any second channel 118 is greater than the maximum width 117 of any first channel 116. First channels 116 may, for example, be designed to accommodate one or more single splice fibers, while second channels 118 may, for example, be designed to accommodate one or more ribbon splices (including for example intermittently bonded ribbon splices).

In exemplary embodiments, the first channels 116 and second channel(s) 118 may be aligned in a linear array. When the splice module 100 is inserted in the cassette 10, the linear array may extend along the lateral axis 114.

In exemplary embodiments, a second channel 118 may be positioned between a first portion 120 of the first channels 116 and a second portion 122 of the first channels 116. Each portion may include one or more first channels 116, such as in exemplary embodiments a plurality of first channels 116. In exemplary embodiments, the first portion 120 and second portion 122 include the same number of first channels 116.

Each first channel 116 may include one or more channel portions 115', 115''. In exemplary embodiments, each channel portion 115 may have a generally elliptical cross-sectional profile. When the splice module 100 is inserted in the cassette 10, the channel portions 115 may be stacked and aligned along the transverse axis 16. Further, the maximum width 117 in each channel portion 115', 115'' may in exemplary embodiments be the same. Alternative, the maximum width 117 in a channel portion 115' may be different from the maximum width 117 of a channel portion 115'' in a channel 116.

A cassette 10 in accordance with the present disclosure may further include a cover 80 which is removably connectable to the cassette body 20, such as at the top 27 thereof. When connected, the interior 21 may be disposed between the cover 80 and base wall 30 along the transverse axis 16. Cover 80 may include a cover body 82 which, when connected to cassette body 20, extends along the longitudinal axis 12 between a front 82 and a rear 83 and extends along the lateral axis 14 between a first side 84 and a second side 85.

Cover 80 may further include a plurality of tabs 90 which extend from the front 82 along the longitudinal axis 12. When the cover 80 is removably connected to the body 20, the tabs 90 may be removably inserted into the interior 21. More particularly, in exemplary embodiments, each of the plurality of tabs 90 may be removably insertable into one of the plurality of adapter apertures 40. Accordingly, when the cover 80 is removably connected to the body 20, the tabs 90 may be removably inserted into the apertures 40. Tabs 90 thus align and secure the cover 80 with respect to the body 20.

Cover 80 may further include a latch 92, which may be proximate the rear 83. Latch 92 may, for example, include a step 93. The latch 92, and in particular the step 93 thereof, may contact the body 20, such as the rear wall 36 thereof, when the cover 80 is removably connected to the cassette body 20. Further, to disconnect the cover 80, a user may need to manipulate the latch 92 such that the latch 92, and in particular the step 93 thereof, is out of contact with the body 20, such as the rear wall 36 thereof. Latch 92 thus secures the cover 80 to the body 20.

Cover 80 may further include one or more side tabs 96, 98. Side tabs 96, 98 may be disposed at the first side 84 and second side 85, respectively. For example, when cover 80 is removably connected to cassette body 20, side tabs 96, 98 may extend from the cover body 82 into the interior 21, such as along the transverse axis 16.

Each tab 96, 98 may interface with a tab 46, 48 of cassette body 20, as discussed herein. For example, each tab 96, 98 may include a slot 97, 99 defined therein. Tabs 46, 48 may be removably insertable into the slots 97, 99, respectively, when the cover 80 is removably connected to the cassette body 20. Tabs 96, 98 may thus align and secure the cover 80 with respect to the body 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic cassette defining a mutually orthogonal coordinate system having a longitudinal axis, a lateral axis, and a transverse axis, the fiber optic cassette comprising:
    a cassette body, the cassette body comprising a plurality of walls extending along the longitudinal axis, the lateral axis, and the transverse axis to form an interior, wherein a first aperture is formed through a first wall of the plurality of walls and a second aperture is formed through a second wall of the plurality of walls opposite of the first wall, wherein a plurality of retention tabs is positioned in the interior, and wherein a splice module receptacle is formed at the interior, the plurality of retention tabs surrounding the splice module receptacle; and
    a splice module removably insertable to the splice module receptacle at the interior formed at the cassette body, the splice module comprising an insert body, the insert body forming a plurality of first channels extending from a first side of the insert body, the insert body forming a second channel extending from a second side of the insert body, wherein the plurality of first channels and the second channel are configured to respectively receive a splice fiber, wherein the plurality of first channels comprises a first portion and a second portion aligned along the transverse axis when the splice module is inserted to the splice module receptacle, and wherein the second channel is positioned between the first portion and the second portion of a plurality of first channels.

2. The fiber optic cassette of claim 1, wherein the first channel and the second channel are aligned in a linear array.

3. The fiber optic cassette of claim 2, wherein the first channel and the second channel are aligned along the lateral axis in the linear array when the splice module is inserted to the splice module receptacle.

4. The fiber optic cassette of claim 1, wherein the first channel and the second channel extend along the longitudinal axis when the splice module is inserted to the splice module receptacle.

5. The fiber optic cassette of claim 4, wherein the first aperture is separated from the second aperture along the longitudinal axis.

6. The fiber optic cassette of claim 1, wherein the splice module receptacle comprises a frame and a clip configured to removably attach the splice module to the interior.

7. The fiber optic cassette of claim 1, the splice module comprising a holder base and a holder cover, wherein a splice insert is disposable between the holder base and the holder cover.

8. The fiber optic cassette of claim 7, wherein the holder base and a holder clip are removably connectable to one another via a clip to removably secure the splice insert therebetween.

9. The fiber optic cassette of claim 1, wherein at least a portion of the plurality of retention tabs extend from one or more of the plurality of walls of the cassette body toward the splice module receptacle at the interior.

10. The fiber optic cassette of claim 1, wherein the plurality of retention tabs extend from the second wall toward the splice module receptacle.

11. The fiber optic cassette of claim 10, wherein the second wall comprises a curved portion, wherein at least a portion of the plurality of retention tabs extend from the second wall toward the splice module receptacle.

12. The fiber optic cassette of claim 10, wherein the second wall comprises a curved portion, wherein at least a portion of the plurality of retention tabs extend from a side wall extending from the curved portion of the second wall.

13. The fiber optic cassette of claim 1, wherein a maximum width of the second channel is greater than a maximum width of the first channel.

14. The fiber optic cassette of claim 1, comprising:
a cover removably connectable to the cassette body, wherein the cover comprises a cover body extending along the longitudinal axis and the lateral axis corresponding to the plurality of walls of the cassette body, wherein the cover comprises a plurality of tabs extending from one or more of the plurality of walls of the cassette body, one or more of the plurality of tabs removably insertable into one or more apertures at the cassette body when the cover is removably connected to the cassette body.

15. The fiber optic cassette of claim 14, the cover comprising a latch configured to contact the cassette body when the cover is connected to the cassette body.

16. The fiber optic cassette of claim 15, wherein the latch is configured to contact the cassette body at the second wall opposite of the first wall at the cassette body.

17. The fiber optic cassette of claim 15, the latch comprising a step, wherein the step is configured to contact the second wall at the cassette body when the cover is connected to the cassette body.

18. The fiber optic cassette of claim 14, the cover comprising a slot configured to receive a corresponding member extending along the transverse axis from the cassette body.

* * * * *